UNITED STATES PATENT OFFICE.

ALFRED BRACONNIER, OF NANCY, FRANCE.

MANUFACTURE OF IRON AND STEEL.

SPECIFICATION forming part of Letters Patent No. 239,711, dated April 5, 1881.

Application filed July 2, 1880. (No specimens.) Patented in France March 18, 1880.

*To all whom it may concern:*

Be it known that I, ALFRED BRACONNIER, of Nancy, in the Republic of France, have invented certain new and useful Improvements in the Manufacture of Iron and Steel by treating cast-iron in Bessemer converters, of which the following is a specification.

The process to which this invention relates is applicable to the treatment of common white or chilled cast-iron, and the products obtained are of the greatest purity. With the ordinary processes it is necessary to employ cast-iron containing a proportion of silica and graphite in order to have combustible matter for generating the heat necessary to the operation, and more or less of these impurities remain in the final product.

The invention consists in superheating the iron, before its introduction into the converter, to the temperature to which the final product should come, and in finishing the treatment by means of reducing and carbureted gases from a suitable generator, which are forced through the molten metal in the converter.

For the sake of clearly indicating the scope of this invention, it may be observed that heretofore a preliminary heating of the metal in a refining-furnace has been resorted to with iron deficient in carbon, in order to supply the heat necessary to the converting operation, and also that gases containing reducing compounds of carbon—carbonic oxide, for example—have been introduced into the molten iron in a converter. These gases, however, have been introduced mainly for removing sulphur and similar impurities, and have not been employed in treating cast-iron poor in silicon and carbon in connection with a preliminary superheating operation, as specified above.

The invention is carried into effect in the following manner: The superheating operation is carried on in reverberatory regenerating-furnaces heated by gas and hot air, and the temperature to be reached, according to the character of the cast-iron, will be readily ascertained by experience. When it is desired to obtain products of the first quality, or to work over scrap-iron or waste pieces of manufacture or old rails, it will be well to add so much manganiferous cast-iron as to have one per cent. to three per cent. of manganese in the batch. The iron, superheated, as described, is turned into the converter, and about twelve per cent. to fifteen per cent. of lime, previously heated to a high temperature, is added. In ten or twenty seconds after the disappearance of the carbon the first slag is drawn off. A proportion of eight per cent. to ten per cent. of lime mixed with two per cent. of calcareous iron ore is added, and the slag drawn off again. After drawing off the slag a current of reducing-gas—such, for example, as obtained from a gas generator or carburetor—is passed through the molten and slightly-oxidated metal. The use of the current of gas permits the obtaining not only of soft iron, but also of steel containing more or less carbon. It permits, also, the dispensing with the costly product called "spiegel," commonly or frequently required; but nevertheless it does not forbid the use of spiegel, ferro-manganese, or similar materials to obtain products with special properties. The gas carries into the bath the carbon required to combine with the oxygen therein contained, and to give the heat necessary to the reaction, without its being necessary to introduce foreign substances, by adding cast-iron, spiegel, &c. By regulating the composition and duration of passage of the gas a product with exactly the qualities wished can be obtained.

In the apparatus used for treating common cast-iron the upper part, which in the Bessemer apparatus chokes rapidly by the solidification of the slag, is rendered movable like the bottom, so that it can be replaced whenever the necessity therefor becomes apparent without its being necessary to put the body of the apparatus out of service. The lateral lining is formed of magnesia bricks, the use of which has been long known. The bottom is constructed in magnesia brick of the first quality, well adjusted before being placed in position, and united by a thin layer of cement of magnesia and clay. The openings for the introduction of the blast are formed by channels in the bricks. Bottoms constructed in this way are incomparably more solid than at present can be obtained with dolomitic clay.

It will be seen that the process permits the treatment indifferently of all kinds of cast-iron, even the white kind, which does not contain enough materials, other than iron, to give the required heat in the ordinary processes.

I claim—

The method of treating and refining cast-iron by superheating the metal, introducing it into a converter, and forcing a current of reducing-gas through the molten metal.

A. BRACONNIER.

Witnesses:
SALIRE ADOLPH,
EUG. DUBAIL.